United States Patent [19]

Fukuba et al.

[11] 4,102,697

[45] Jul. 25, 1978

[54] FLUID PLASTER COMPOSITION

[75] Inventors: Kozo Fukuba; Yasutomo Ogushi, both of Niihama; Haruhisa Harada, Ichihara, all of Japan

[73] Assignee: Sumitomo Chemical Company, Limited, Osaka, Japan

[21] Appl. No.: 703,376

[22] Filed: Jul. 8, 1976

[30] Foreign Application Priority Data

Jul. 9, 1975 [JP] Japan .................................. 50-84807
Mar. 1, 1976 [JP] Japan .................................. 51-22491

[51] Int. Cl.² ............................................ C04B 11/14
[52] U.S. Cl. .................................... 106/111; 106/109
[58] Field of Search ...................... 106/111, 109, 110

[56] References Cited

U.S. PATENT DOCUMENTS

| 2,957,774 | 10/1960 | Selbe et al. | 106/111 |
|---|---|---|---|
| 3,071,481 | 1/1963 | Beach et al. | 106/111 |
| 3,359,146 | 12/1967 | Lane | 106/111 |
| 3,369,915 | 2/1968 | Lee | 106/111 |
| 3,520,708 | 7/1970 | Chambers et al. | 106/111 |
| 3,725,090 | 4/1973 | Lyass et al. | 106/111 |
| 3,926,650 | 12/1975 | Lange et al. | 106/111 |

*Primary Examiner*—Winston A. Douglas
*Assistant Examiner*—John P. Sheehan
*Attorney, Agent, or Firm*—Birch, Stewart, Kolasch and Birch

[57] ABSTRACT

A fluid plaster composition comprising gypsum hemihydrate of $\alpha$-form and a surface active agent of phosphoric ester, which is useful for formation of a horizontal surface by application onto a floor surface.

23 Claims, No Drawings

FLUID PLASTER COMPOSITION

BACKGROUND AND SUMMARY OF THE INVENTION

The present invention relates to a fluid plaster composition which can form a horizontal surface by spontaneous flowing when simply poured onto a floor surface, followed by hardening to afford an excellent surface preciseness as well as a high size preciseness with good workability.

In general, buildings are composed of vertical components and horizontal components. Extensive investigations have been made on vertical components, and various construction processes therefor have been already established. As to formation of a horizontal surface, to the contrary, there has not been attained any notable improvement from the conventional process which is a very complicated one and whose simplification has been highly desired. According to the conventional process for obtaining a horizontal surface, an original floor is formed by sand-spreading or by the use of foaming concrete, and mortar is applied thereon by the aid of a slide rule or a levelling string as the standard. This operation requires specific technical skill, and the area treatable in a unit of time is limited. Besides, the thus formed mortar floor does not show a satisfactory surface preciseness.

There has been proposed a raised floor process in which adjuster bolts are employed for formation of a horizontal surface. However, since the settling according to this method is based on the point load, maintenance of the horizontal surface for a long duration of time is impossible, and so a real fixation can not be attained. Thus, a horizontal floor surface based on the surface load is required.

It is known to incorporate several kinds of additives into anhydrous gypsum or cement materials so as to improve the fluidity for the use as floor materials or the like. For example, West German Pat. No. 1,943,634 discloses that anhydrous gypsum is admixed with a sulfite-modified or sulfonic acid-modified resin based on amino-striazine compound, an alkaline earth metal oxide, a defoaming agent and the like for the use as floor materials. However, mortar or anhydrous gypsum which is employed as the base material in such method is not economical from the industrial viewpoint, compared with gypsum hemihydrate.

The normal water consistency of gypsum hemihydrate of α-form is much lower than that of gypsum hemihydrate of β-form. When gypsum hemihydrate of α-form is employed as a plaster, therefore, the amount of water to be added for kneading can be reduced, which results in good workability and high strength of the hardened product. In spite of these advantages, it does not show such a fluidity as forming a horizontal surface by spontaneous flowing when kneaded with water alone and poured onto the floor surface.

As the result of extensive studies, it has now been found that a mixture of gypsum hemihydrate of α-form with a surface active agent of phosphoric ester shows an improved fluidity when kneaded with water. It has been also found that addition of a sulfonic dispersing agent and an alkali metal surfate to the said mixture improves further the fluidity of the slurry. The present invention is based on these findings.

According to the present invention, there is provided a fluid plaster composition capable of flowing with a low viscosity which comprises gypsum hemihydrate of α-form as the base material and a surface active agent of phosphoric ester. When desired, the composition may include additionally a sulfonic dispersing agent and an alkali metal sulfate, optionally with one or more kinds of other additives such as setting-regulating agents, viscosity-regulating agents, defoaming agents, high polymer emulsions, expansion-inhibiting agents, water-retaining agents, freezing-preventing agents and fillers.

The plaster composition of the invention shows a low viscosity of about 2000 cp or less and is excellent in the initial fluidity. It forms a horizontal surface when simply poured onto a floor surface. The separation of solid and liquid does not occur until the setting-hardening. Since the contraction or expansion of volume is small, cracking or bending is not caused on hardening. Further, the time required for initial setting is from about 5 to 180 minutes, so that walking on the floor surface becomes possible within about 24 hours after application of the composition. Furthermore, a good workability can be obtained because of the excellent fluidity, which is advantageous from the economical viewpoint. Moreover, the formed floor surface shows a high surface preciseness of about ±1.5 mm or less, and possesses a non-inflammable property to resist to fire because of the low content of organic materials.

The plaster composition of the invention can be also applied to vertical components of buildings to afford a high size preciseness, since the contraction or expansion of volume is small. When the composition is poured into a frame for shaping a partition wall, for example, there can be obtained an excellent partition wall without cracking or bending. In such case too, the workability is improved due to the good fluidity.

The hardened product obtained by the use of the composition of the invention shows a pratically sufficient strength, the compressive strength being about 100 kg/cm$^2$ or more and the bending strength being about 50 kg/cm$^2$ or more.

As the gypsum hemihydrate of α-form to be used as the base material in the composition of the invention, there is usually selected the one whose normal water consistency (according to JIS R-9112) is about 27 to 60% by weight, preferably about 50% by weight or less. It is possible to substitute less than about 50% by weight of the gypsum hemihydrate of α-type with gypsum hemihydrate of β-type or anhydrous gypsum.

As the surface active agent of phosphoric ester, there may be used, for example, the one of the formula:

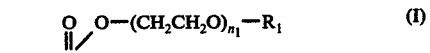
(I)

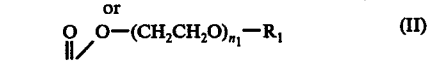
(II)

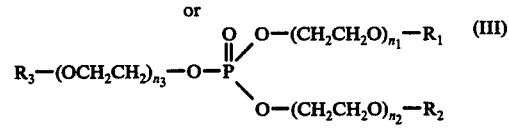
(III)

wherein $R_1$, $R_2$ and $R_3$ are each alkyl, alkylaryl or aryl having 1 to 50 carbon atoms and $n_1$, $n_2$ and $n_3$ are each an integer of 1 to 30. Specific examples are phosphates of polyoxyalkylene alkyl ether (e.g. polyoxyethylene $C_8$-$C_{30}$ alkyl ether, polyoxypropylene $C_8$-$C_{30}$ alkyl ether), phosphates of polyoxyalkylene alkylaryl ether (e.g. polyoxyethylene $C_{14}$-$C_{36}$ alkylaryl ether, polyoxypropylene $C_{14}$-$C_{36}$ alkylaryl ether), etc. The alkali metal and alkaline earth metal salts of these phosphoric esters (i.e. those corresponding to the formula (I) or (II) wherein the hydrogen atom of the hydroxyl group is substituted with an alkali metal or alkaline earth metal) are also utilizable. These surface active agents are commercially available, for example, under the tradename "PLYSURF" (manufactured by DaiIchi Kogyo Seiyaku Co., Ltd.) and, among them, the phosphoric esters having an HLB value of about 6 to 10 and their alkali metal or alkaline earth metal salts are particularly preferred.

The amount of the surface active agent of phosphoric ester to be incorporated may be from about 0.01 to 10 parts by weight, preferably from about 0.02 to 3.0 parts by weight, to 100 parts by weight of gypsum as the base material. When the amount is smaller than the lower limit, the improvement of the fluidity of the plaster composition is hardly achieved. When the amount is larger than the upper limit, the setting-hardening property is greatly deteriorated, and cracking is readily caused on the surface of the product after hardening.

The effect of the surface active agent of phosphoric ester can be enhanced by the combined use with a sulfonic dispersing agent for cement. As the sulfonic dispersing agent, there may be exemplified sodium ligninsulfonate, calcium ligninsulfonate, sodium salt of $\beta$-naphthalenesulfonic acid-formaldehyde condensation product, $\beta$-creosotesulfonic acid, condensation product of cresolsulfonic acid, sulfonate of melamine-formaldehyde condensation product, etc. These dispersing agents are those originally developed for the use to cement, and only a smaller effect is exerted in case of their sole use to gypsum. When, however, they are used together with the surface active agent of phosphoric ester, a synergistic effect is produced, and a plaster composition being excellent in initial fluidity and retaining a sufficient setting-hardening property is obtainable.

The sulfonic dispersing agent may be used in an amount of about 0.1 to 2.5 parts by weight, preferably about 0.15 to 2.5 parts by weight, to 100 parts by weight of gypsum as the base material. When the amount is smaller than the lower limit, the synergistic effect with the surface active agent of phosphoric ester is hardly expected. When the amount is larger than the upper limit, the fluidity is reduced and the setting-hardening property is sometimes deteriorated.

As the expansion-preventing agent or the setting-hardening agent, there are known various sulfuric salts. In the present invention, the use of an alkali metal sulfate is particularly effective for improvement of the fluidity. Examples of the alkali metal sulfate are sodium sulfate, potassium sulfate, rubidium sulfate, cesium sulfate, etc. Among them, sodium sulfate and potassium sulfate are favored from the economical viewpoint. By the combined use of such alkali metal sulfate with the sulfonic dispersing agent, the fluidity is further improved, and the setting-hardening property and the expansion-preventing effect are also enhanced. The amount of the alkali metal sulfate to be added is about 0.2 to 3.0 parts by weight, preferably about 0.5 to 2.0 parts by weight, to 100 parts by weight of gypsum as the base material. When the amount is smaller than the lower limit, the effect to be expected by the combined use with the sulfonic dispersing agent is hardly obtained, and the expansion-preventing effect is also reduced. When the amount is larger than the upper limit, the setting rate tends to become extremely large to lower the workability as well as the fluidity.

In the composition of the invention, there may be further incorporated, in case of necessity, one or more kinds of other additives such as setting-regulating agents, viscosity-regulating agents, defoaming agents, high polymer emulsions, expansion-inhibiting agents, water-retaining agents, freezing-preventing agents and fillers.

The setting-regulating agent is used for regulating the time for initial setting of the plaster composition. For the gypsum hemihydrate of $\alpha$-form, a retarding agent such as a phosphoric acid salt, a carboxylic acid salt or a protein is employed. By changing the amount added, the time for initial setting can be adjusted optionally, and it may be usually from about 5 to 180 minutes, preferably from about 15 to 120 minutes, depending on the kind and the amount of the dispersing agent, the properties of the gypsum used and the like.

The viscosity-regulating agent, the high polymer emulsion and the water-retaining agent are employed for preventing separation of solid and liquid of the slurry poured onto the floor surface until the initial setting or deterioration of the quality of the surface of the hardened product. For such purposes, the use of a viscosity-increasing agent of cellulose compound, vinyl compound or acryl compound, a high polymer emulsion, a size material and the like is preferable. These additives are employed in such amounts that the initial fluidity of the slurry is not lost and the separation of solid and liquid does not take place.

The defoaming agent is used for preventing the generation of foams on preparation of the slurry. When the slurry containing foams is as such poured onto the floor surface, the formation of a horizontal surface is hindered, and besides, the surface of the product after hardening shows a pockmarked appearance. As the defoaming agent, there are exemplified a silicon compound, a nonionic surface active agent, etc. Since the effect of the defoaming agent is varied depending on the combination with the surface active agent of phosphoric ester, the sulfonic dispersing agent and the like, appropriate selection of its kind is necessary. The amount to be used is about 0.01 to 0.2 part by weight to 100 parts by weight of the gypsum as the base material.

The amount of water as the dispersing medium has a great influence on the fluidity of the produced slurry. In the present invention, the proportion of water to the gypsum hemihydrate of $\alpha$-form may be usually in the range of about 0.20 to 0.50 by weight, preferably of about 0.23 to 0.45 by weight, in case of using as the base material the gypsum hemihydrate of $\alpha$-form alone. When the proportion of water to the gypsum is smaller than the lower limit, the fludity is insufficient. When it is larger than the upper limit, the fludity is satisfying, but there are caused various troubles such as separation of solid and liquid, unsatisfactory setting, insufficient strength of the product and the like. In case of using anhydrous gypsum as a part of the base material, the proportion of water to the base gypsum may be in the same range as mentioned above. In case of using gypsum hemihydrate of $\beta$-form as a part of the base material, to the contrary, the proportion of water to the base gypsum is usually in the range of about 0.20 to 0.70 by weight, preferably of about 0.23 to 0.60 by weight, the value being varied depending on the content of the gypsum hemihydrate of β-form.

In case of necessity, a filler may be incorporated into the composition in such an amount that the fluidity of the slurry is not influenced. Examples of the filler are sand, fly ash, slag and the like. In usual, sand for mortar, cements and various inorganic waste materials are employed. The amount of the filler may be usually from about 0 to 350 parts by weight, preferably from about 250 parts by weight or less, to 100 parts by weight of the base gypsum.

For preparation of the plaster composition of the invention, the gypsum as the base material may be admixed with a small amount of water and the surface active agent of phosphoric ester, if necessary, together with other additives by the acid of any conventional mixing means to obtain a composition with an excellent fluidity.

Practical and presently preferred embodiments of the invention are illustratively shown in the following Examples, wherein % and part(s) are by weight.

EXAMPLE 1

To gypsum hemihydrate of α-form (normal water consistency, 37%) (100 parts), "PLYSURF" having an HLB value shown below (manufactured by Dai-Ichi Kogyo Seiyaku Co., Ltd.) (0.35 part) as the surface active agent of phosphoric ester and water (35 parts) as the dispersing medium are added, and the mixture is kneaded uniformly by the aid of a mixer to obtain a slurry. The slump value of the slurry is as shown in Table 1.

The determination of the slump value is effected in the following manner: the slurry is charged into a pipe of 5.4 cm in inner diameter and 9.5 cm in height, the pipe is pulled up vertically 40 seconds thereafter and the diameter of the slurry which is spread out in circular form is measured as the slump value. A larger slump value means a higher fluidity.

Table 1

| PLYSURF grade | HLB value | Slump value (cm) |
|---|---|---|
| Not added | — | 12.0 |
| A 208 B | 6.6 | 17.2 |
| A 208 S | 7.0 | 16.9 |
| A 212 C | 9.4 | 15.3 |
| A 210 G | 9.6 | 14.5 |
| A 217 E | 14.9 | 12.5 |

From Table 1, it is apparent that the fluidity is greatly improved by the addition of "PLYSURF".

EXAMPLE 2

Table 2

| Composition | Amount (part(s)) |
|---|---|
| Gypsum hemihydrate of α-form (normal water consistency, 37%) | 100 |
| PLYSURF A 208 B (manufactured by Dai-Ichi Kogyo Seiyaku Co., Ltd.) | 0.27 |
| Silicone KM 72 (manufactured by Shinetsu Kagaku Co., Ltd.; defoaming agent) | 0.03 |
| Sodium citrate (setting-regulating agent) | 0.025 |
| Water | 27 |

These substances are mixed well to obtain a slurry. The slump value of the slurry is 15 cm. The slurry is poured into a frame having an area of 2 m² (unevenness of original floor, ±10 mm) in an amount of 48 kg/m² to make an average thickness of 30 mm. The hardening is almost completed 3 hours after the pouring, and soft walking is possible after 7 hours. The horizontal surface preciseness at this time is ±1.4 mm. The hardened product after 1 day shows a compressive strength (JIS A-1108) of 170 kg/cm², a bending strength (JIS A-1106) of 70 kg/cm² and an apparent specific gravity of 1.90 g/cm³. There is not seen any abnormal state such as cracking on the surface.

EXAMPLE 3

Table 3

| Composition | Amount (part(s)) |
|---|---|
| Gypsum hemihydrate of α-form (normal water consistency, 35%) | 100 |
| PLYSURF A 208 B (manufactured by Dai-Ichi Kogyo Seiyaku Co., Ltd.) | 0.25 |
| Silicone KM 72 (manufactured by Shinetsu Kagaku Co., Ltd.; defoaming agent) | 0.03 |
| Water | 35 |

These substances are mixed well to make a slurry. The slump value of the slurry is 21 cm. (In case of eliminating PLYSURF A 208 B from the above starting materials shown in Table 3 (i.e. blank experiment), the slump value is 9.5 cm.) The slurry is poured into a frame having an area of 1 m² (unevenness of original floor, ±10 mm) to make an average thickness of 30 mm. The hardening is almost completed after 4 hours. The horizontal surface preciseness at this time is ±1.2 mm.

EXAMPLE 4

Table 4

| Composition | Amount (part(s)) |
|---|---|
| Gypsum hemihydrate of α-form (normal water consistency, 40%) | 100 |
| Polyoxyethylene alkyl ether phosphate | 0.25 |
| Silicone KM 72 (manufactured by Shinetsu Kagaku Co., Ltd.; defoaming agent) | 0.03 |
| Water | 40 |

These substances are mixed well to make a slurry. The slump value of the slurry is 20 cm. In case of eliminating the phosphoric ester from the starting materials shown in Table 4, the slump value is 11.2 cm. Thus, the phosphoric ester is proved to be effective for improving the fluidity.

EXAMPLE 5

Table 5

| Composition | | Amount (part(s)) |
|---|---|---|
| Base material | Gypsum hemihydrate of α-form (normal water consistency, 35%) | 100 |
| Dispersing medium | Water | 27 |
| Sulfonic dispersing agent | Sodium ligninsulfonate | 0.2 |
| Surface active agent of phosphoric ester | PLYSURF A 208 B (manufactured by Dai-Ichi Kogyo Seiyaku Co., Ltd.) | 0.189 |
| Dispersion-promoting agent (expansion-preventing agent) | Potassium sulfate | 1.2 |
| Setting-regulating agent | Sodium tripolyphosphate (hexahydrate) | 0.05 |
| Viscosity-regulating agent | Methyl cellulose (No. 25) | 0.05 |
| Defoaming agent | Silicone | 0.03 |

These substances are mixed well to make a slurry. The viscosity of the slurry is 450 cp (determined by the aid of the B type viscosimeter No. 2, 30 rpm, manufactured by Tokyo Keiki). The initial setting time is 60 minutes and the slump value is 16 cm. The slurry is poured into a frame having an area of 2 m² (unevenness of original floor, ±9 mm) in an amount of 32 kg/cm² to make an average thickness of 20 mm. After 3 hours, the hardening is almost completed, and there is not caused any abnormal state even when the surface is pressed with a finger. After 8 hours, walking is possible. The horizontal surface preciseness at this time is ±1.2 mm (determined by the aid of the automatic level B2, manufactured by Sokkisha; interval, 100 mm). The hardened product shows a compressive strength of 150 kg/cm² (1 day after the pouring) and of 420 kg/cm² (7 days after the pouring), a bending strength of 105 kg/cm² (1 day after the pouring) and of 122 kg/cm² (7 days after the pouring), an apparent specific gravity of 1.85 g/cm³ and an expansion rate of 0.17% by volume. Cracking is not seen on the surface.

EXAMPLE 6

The base material and water shown in Table 7 are mixed well together with the additives shown in Table 6 to make a slurry. The slump value is as shown in Table 7. From such result, it is apparent that a sufficient fluidity is achieved.

Table 6

| Composition | | Amount (part(s)) |
|---|---|---|
| Base material | (shown in Table 7) | 100 |
| Dispersing medium | Water | (shown in Table 7) |
| Sulfonic dispersing agent | Sanekis P 252 (manufactured by Sanyo Kokusaku Pulp Co., Ltd.; sodium ligninsulfonate) | 0.2 |
| Surface active agent of phosphoric ester | PLYSURF A 208 B (manufactured by Dai-Ichi Kogyo Co., Ltd.) | 0.296 |
| Dispersion-promoting agent (expansion-preventing agent) | Potassium sulfate | 0.1 |
| Setting-regulating agent | Sodium tripolyphosphate (anhydrous salt) | 0.02 |
| Viscosity-regulating agent | Methyl cellulose | 0.05 |
| Defoaming agent | Silicone KM 72 (manufactured by Shinetsu Kagaku Co., Ltd.) | 0.03 |

Table 7

| Base material | Amount of water (part(s)) | Slump value |
|---|---|---|
| Gypsum hemihydrate of α-form | 27 | 16.5 |
| Mixture of gypsum hemihydrate of α-form (70 parts) and gypsum hemihydrate of β-form (30 parts) | 32 | 14.0 |
| Mixture of gypsum hemihydrate of α-form (80 parts) and anhydrous gypsum (20 parts) | 28 | 15.0 |

Note: The normal water consistency of the gypsum hemihydrate of α-form, the gypsum hemihydrate of β-form and the anhydrous gypsum are 37%, 72% and 35%, respectively.

EXAMPLE 7

Table 8

| Composition | | Amount (part(s) |
|---|---|---|
| Base material | Gypsum hemihydrate of α-form (normal water consistency, 42%) | 100 |
| Dispersing medium | Water | 27 |
| Sulfonic dispersing agent | β-Naphthalenesulfonic acid-formaldehyde condensation product | 1.0 |
| Surface active agent of phosphoric ester | PLYSURF A 208B Kogyo Seiyaku Co., Ltd.)/ | 0.189 |
| Dispersion-promoting agent (expansion-presenting agent) | Potassium sulfate | 1.0 |
| Setting-regulating agent | Potassium citrate | 0.03 |
| Viscosity-regulating agent | Methyl cellulose (No. 25) | 0.05 |
| Defoaming agent | Silicone | 0.03 |

These substances are mixed well to make a slurry. The viscosity of the slurry is 300 cp. The initial setting time is 40 minutes. The slump value is 17 cm. The slurry is poured into a frame having an area of 2 m² (unevenness of original floor, ±7.2 mm) in an amount of 32 kg/cm² to make an average thickness of 20 mm. After 1 hour, the hardening is almost completed, and there is not caused any abnormal state even when the surface is pressed with a finger. After 6 hours, walking is possible. The horizontal surface preciseness at this time is ±0.8 mm. The hardened product shows a compressive strength of 300 kg/cm² (1 day after the pouring) and of 600 kg/cm² (7 days after the pouring), a bending strength of 70 kg/cm² (1 day after the pouring) and of 120 kg/cm² (7 days after the pouring), an apparent specific gravity of 1.85 g/cm³ and an expansion rate of 0.20% by volume. Cracking is not seen on the surface.

EXAMPLE 8

Table 9

| Composition | | Amount (part(s)) |
|---|---|---|
| Base material | Gypsum hemihydrate of α-form (normal water consistency, 34%) | 100 |
| Dispersing medium | Water | 32 |
| Sulfonic dispersing agent | β-Naphthalenesulfonic acid-formaldehyde condensation product | 1.2 |
| Surface active agent of phosphoric ester | PLYSURF A 208 B (manufactured by Dai-Ichi Kogyo Seiyaku Co., Ltd.) | 0.189 |
| Dispersion-promoting agent (expansion-preventing agent) | Potassium sulfate | 0.75 |
| Viscosity-regulating agent | Methyl cellulose (No. 25) | 0.05 |
| Defoaming agent | Silicone | 0.03 |
| Filler | River sand | 20 |

The substances are mixed well to make a slurry. The viscosity of the slurry is 1200 cp. The initial setting time is 90 minutes. The slump value is 14.5 cm. The slurry is poured into a frame having an area of 2 m² (unevenness of original floor, ±7.5 mm) in an amount of 40 kg/cm² to make an average thickness of 25 mm. The hardening is almost completed after 1.5 hours, and walking is possible after 24 hours. The horizontal surface preciseness at this time is ±1.4 mm.

In this specification, the term "JIS" is an abbreviation of Japanese Industrial Standard.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plaster composition which comprises:
(1) gypsum containing gypsum hemihydrate of the α-form in an amount of not less than about 50% by weight of the total plaster content,
(2) about 0.01 to 10 parts by weight to 100 parts by weight of the gypsum of a surface reactive agent of a phosphoric ester of the formula:

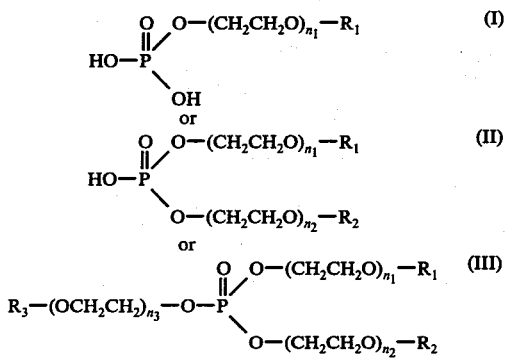

wherein $R_1$, $R_2$, and $R_3$ are each alkyl, alkylaryl or aryl having 1 to 50 carbon atoms, and $n_1$, $n_2$, and $n_3$ are each an integer of 1 to 30,
(3) a sulfonic dispersing agent, and
(4) an alkali metal sulfate selected from the group consisting of sodium sulfate, potassium sulfate, rubidium sulfate and cesium sulfate.

2. The plaster composition according to claim 1, which contains water.

3. The plaster composition according to claim 1, which contains about 20 to 70 parts by weight of water.

4. The plaster composition according to claim 3, wherein the sulfonic dispersing agent and the alkali metal sulfate are present in amounts of about 0.1 to 2.5 parts by weight and about 0.2 to 3.0 parts by weight, respectively.

5. The plaster composition according to claim 1, wherein the gypsum hemihydrate of α-form has a normal water consistency of about 27 to 60% by weight.

6. The plaster composition according to claim 1, wherein the surface active agent is a phosphoric ester having an HLB value of about 6 to 10, or the alkali metal or alkaline earth metal salt thereof.

7. The plaster composition according to claim 5, wherein the surface active agent is a member selected from the group consisting of phosphates of polyalkylene alkyl ethers and phosphates of polyoxyalkylene alkylaryl ethers.

8. The plaster composition according to claim 1, wherein the sulfonic dispersing agent is selected from the group consisting of sodium ligninsulfonate, calcium ligninsulfonate, sodium salt of β-naphthalenesulfonic acidformaldehyde condensation product, β-creosotesulfonic acid, condensation product of cresolsulfonic acid and sulfonate of melamine-formaldehyde condensation product.

9. The plaster composition of claim 2 having a viscosity of up to about 2000 cp.

10. The plaster composition of claim 1 in a hardened state, said composition having a compressive strength of at least about 100 kg/cm² and a bending strength of at least about 50 kg/cm².

11. The plaster composition of claim 1, wherein the sufface active agent is present in an amount of about 0.02 to 3 parts by weight to 100 parts by weight of the gypsum.

12. The plaster composition of claim 1, wherein the sulfonic dispersing agent is present in an amount of about 0.1 to 2.5 parts by weight per 100 parts by weight of the gypsum.

13. The plaster composition of claim 1, wherein the alkali metal sulfate is present in an amount of about 0.2 to 3.0 parts by weight per 100 parts by weight of the gypsum.

14. The plaster composition of claim 2, wherein when the α-form of gypsum hemihydrate is the only form of gypsum utilized or when a mixture of the α-form of gypsum with anhydrous gypsum is utilized, the proportion of water to the gypsum hemihydrate of the α-form is in the range of about 0.20 to 0.50 by weight.

15. The plaster composition of claim 2, wherein when a mixture of the α-form of gypsum hemihydrate with the β-form of gypsum hemihydrate is utilized, the proportion of water to the mixture is in the range of about 0.20 to 0.70 by weight.

16. The plaster composition according to claim 1, which further comprises a setting-regulating agent.

17. The plaster composition according to claim 1, which further comprises a viscosity-regulating agent.

18. The plaster composition according to claim 1, which further comprises a foaming agent.

19. The plaster composition according to claim 1, which further comprises a high polymer emulsion.

20. The plaster composition according to claim 1, which further comprises an expansion-preventing agent.

21. The plaster composition according to claim 1, which further comprises a water retaining agent.

22. The plaster composition according to claim 1, which further comprises a freezing preventing agent.

23. The plaster composition according to claim 1, which further comprises a filler.

* * * * *